United States Patent [19]

Erhardt

[11] Patent Number: 5,076,095
[45] Date of Patent: Dec. 31, 1991

[54] PLUMBING LEAK TESTING APPARATUS

[76] Inventor: Rick D. Erhardt, 7207 N. 37th Ave., Phoenix, Ariz. 85051

[21] Appl. No.: 528,871

[22] Filed: May 25, 1990

[51] Int. Cl.⁵ .............................................. G01M 3/28
[52] U.S. Cl. ....................................... 73/49.8; 138/90
[58] Field of Search .................... 73/40.5 R, 40, 49.8; 138/90, 94, 94.3, 94.5; 251/145, 306

[56] References Cited

U.S. PATENT DOCUMENTS

| | | | |
|---|---|---|---|
| 2,299,116 | 10/1942 | Svirsky | 138/90 |
| 2,422,801 | 6/1947 | Rohling | 138/94 X |
| 3,425,439 | 4/1969 | Duffey et al. | 251/306 |
| 3,902,697 | 9/1975 | Robinson | 251/306 |
| 4,051,717 | 10/1977 | Miller | 73/46 |
| 4,311,038 | 1/1982 | Dunn | 73/49.8 |
| 4,429,568 | 2/1984 | Sullivan | 73/49.5 |
| 4,542,642 | 9/1985 | Tagliarino | 73/40.5 R |
| 4,770,029 | 9/1988 | Webber et al. | 73/46 |

Primary Examiner—Tom Noland
Assistant Examiner—Joseph W. Roskos
Attorney, Agent, or Firm—David G. Rosenbaum

[57] ABSTRACT

An apparatus for pressure testing a plumbing system having a fluid inlet assembly having an inlet connection, a pressure-actuated flow regulator valve, and a fluid inlet, all made from or lined with corrosion resistant materials. A paddle shaped member is coaxially coupled to a freely rotatable threaded cap member which removably engages the tee fitting in the plumbing system. O-rings along the outer edges of a paddle-shaped member serve to seat the paddle-shaped member into the inner diameter of the tee-fitting and seal the downstream portion of the Y or tee fitting from the upstream portion.

14 Claims, 2 Drawing Sheets

PLUMBING LEAK TESTING APPARATUS

BACKGROUND OF THE INVENTION

This invention relates generally to devices for testing plumbing systems for fluid integrity. More particularly, the present invention relates to an apparatus for pressure testing plumbing systems for the presence of leakage under pressure, which couples to a tee fitting to a vent stack in the plumbing system, closes off the vent stack and permits pressurization of the plumbing system to determine the presence of a leak.

All plumbing installations require that a vent stack be coupled to the plumbing system to prevent formation of a vacuum generated by fluid in the pipes. A tee or Y fitting is typically installed at the junction between the vent stack and the remainder of the plumbing network. Prior to certifying the leak tightness of a plumbing systems, the vent stack is fluid pressurized to determine whether the existence of leakage. The most widely used method of fluid pressurizing the vent stack requires a workman to climb onto the roof of the structure with a hose and fill the vent stack from the top. This is, of course dangerous and time consuming.

Various apparatus have been devised which are adapted to removably couple to the tee or Y fitting in the plumbing system to seal the system and permit pressure leak testing. For example, U.S. Pat. No. 4,542,642 issued to Tagliarino teaches that it is known to seal the tee fitting with a blocking disk seated on an inner ledge of the tee. After the blocking disk is so seated, water is introduced into the vent stack through a threaded plate coupled to the tee fitting. Similarly, U.S. Pat. No. 4,429,568 issued to two embodiments of a sealing member adapted to seal the vent stack at a tee or Y-fitting. Sullivan teaches that it is known to dispose an imperforate plate or a pneumatically inflated bulb in the tee or Y fitting to seal the vent stack. After sealing the vent stack fluid to pressurize the vent stack is introduced through a threaded cap engaged upon the tee fitting. Another type of plumbing tester is illustrated by U.S. Pat. No. 3,216,456 issued to La Voie. This patent teaches that it is known to dispose an expandable plug into a plumbing line. This device has a coaxial fluid conduit which introduces fluid into the plumbing line for pressure testing. Also well known within the art are the use of ball check valves.

None of the foregoing patents, however, disclose an apparatus having a paddle-shaped member rotatably coupled to a valved threaded cap adapted to removably engage a plumbing Y or tee fitting. Moreover, none of the art teaches pressurization of the plumbing by introducing fluid for pressurization through a pressure-actuated valve disposed in-line with the fluid source. Finally, none of the prior art devices teach an apparatus employing a paddle member rotatably coupled to the threaded cap, which permits sealing of the vent stack and draining of the vent stack without removal of the device. The present invention allows the fluid to be added to the drainage system from the location of the Y or tee fitting rather than at the top of the drainage system. The present invention also does not require a special test section, a source of pressurized air, nor the use of an inflatable bulb or plug with their inherent risk of breakage.

There exists a need, therefore, for a reliable, easy to use plumbing leak tester capable of efficiently testing a liquid drain and vent plumbing system, as so described by the present invention.

SUMMARY OF THE INVENTION

According to a broad aspect of the invention, the present invention provides a plumbing leak tester which simplifies leak testing of liquid drain and plumbing systems.

It is another broad object of the present invention to provide a plumbing leak tester which efficiently and reliably allows fluid to be added to the plumbing system while sealing the drain until the testing of the system is complete.

In accordance with the objects of the invention, the invention comprises a fluid inlet assembly having an inlet connection, a pressure-actuated flow regulator valve, and a fluid inlet, all made from or lined with corrosion resistant materials. A paddle shaped member is coaxially coupled to a freely rotatable threaded cap member which removably engages the tee fitting in the plumbing system. O-rings along the outer edges of a paddle-shaped .member serve to seat the paddle-shaped member into the inner diameter of the tee-fitting and seal the downstream portion of the Y or tee fitting from the upstream portion. Fluid for pressurization is introduced into the plumbing system through the fluid inlet and the system is tested for leaks. After testing is complete, the paddle-shaped member is rotated within the tee-fitting to drain the fluid within the vent stack into the drain pipe. Those skilled in the art will understand and appreciate that the present invention may also be utilized to pressurize a plumbing line in order to clear an obstruction.

These and other objects, features and advantages of the present invention will become more apparent when taken with reference to the accompanying drawings and the following more detailed description of the preferred embodiments of the invention.

DETAILED DESCRIPTION OF THE PREFERRED EMBODIMENTS

Figure 1:
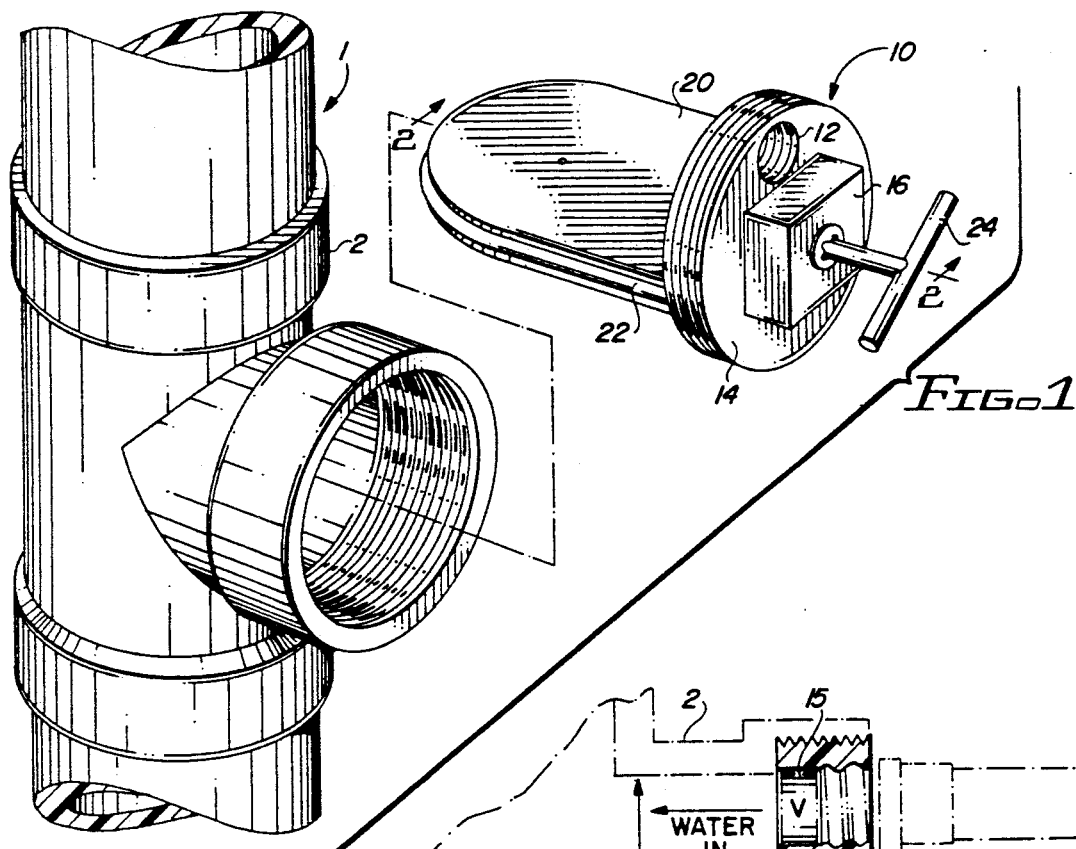
FIG. 1 is a perspective exploded view of the plumbing leak testing apparatus of the invention and a typical tee-fitting into which the leak testing apparatus may be removably engaged.
Figure 2:
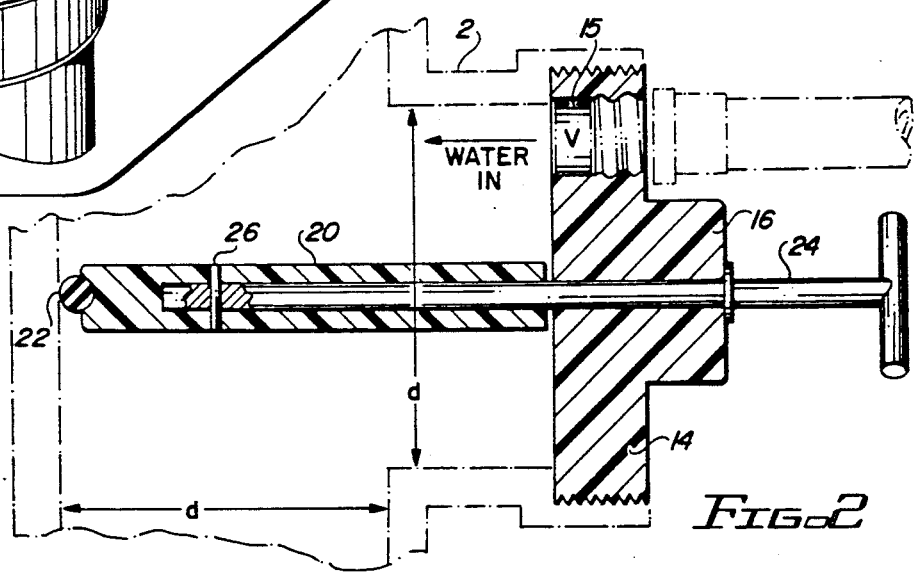
FIG. 2 is a cross-sectional side elevational view of the plumbing leak testing apparatus of the invention taken along line 2—2 in FIG. 1.
Figure 3:
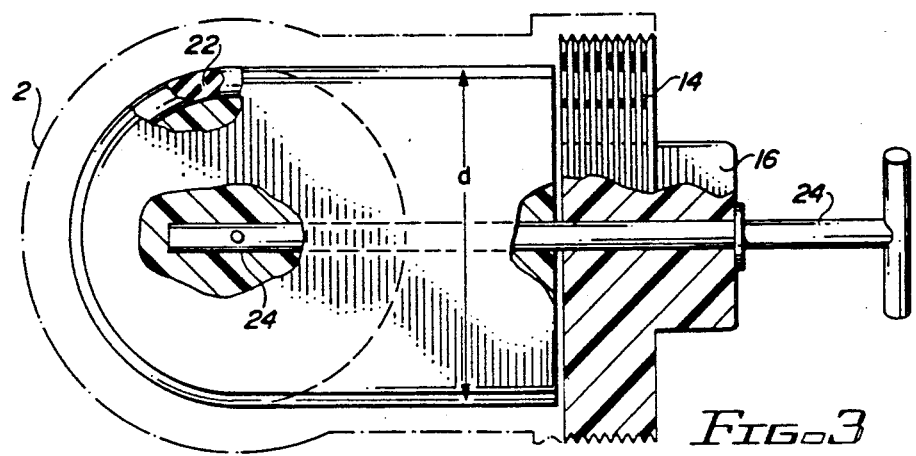
FIG. 3 is a partial cross-sectional top elevational view of the plumbing leak testing apparatus according to the invention.

The first preferred embodiment of the invention, designated generally 10, is illustrated with reference to FIGS. 1-3 in the accompanying drawings. The plumbing leak tester 10 consists generally of a cap member 14 having a fluid inlet 12 passing therethrough. Fluid inlet 12 is adapted to demountably couple to a fluid source, such as a garden hose coupling member, shown in phantom in FIG. 2. According to the preferred embodiment of the invention, fluid inlet 12 has an associated valve 15, which may be pressure actuated, to introduce fluid for pressurization into the plumbing network. A sealing member 20 is rotatably coupled to cap member 14 by a coaxially aligned shaft member 24, which passes through a central bore in cap member 14, passed into a central bore in sealing member 20 and is attached to sealing member 20 by suitable attachment means 26. Attachment means 26 may consist of any means sufficient to immovably coupled shaft 24 to sealing member 20 and resist torsional forces when shaft 24 is rotated. To assure a fluid-tight seal within tee fitting 2, an o-ring sealing member 22 is provided about the outer perimeter of sealing member 20 and engages, in a fluid tight relation, the inner diameter d of the tee-fitting 2.

It is further desirable to provide a protrusion 16 associated with the cap member 14 to permit engagement of a wrench or other tool for tightening the cap member 14 in the tee-fitting 2. Those skilled in the art will understand that the above-described leak testing apparatus 10 is preferably made of a plastic material, such as ABS plastic, but may also be made of any suitably corrosion-resistant material.

Figure 5:
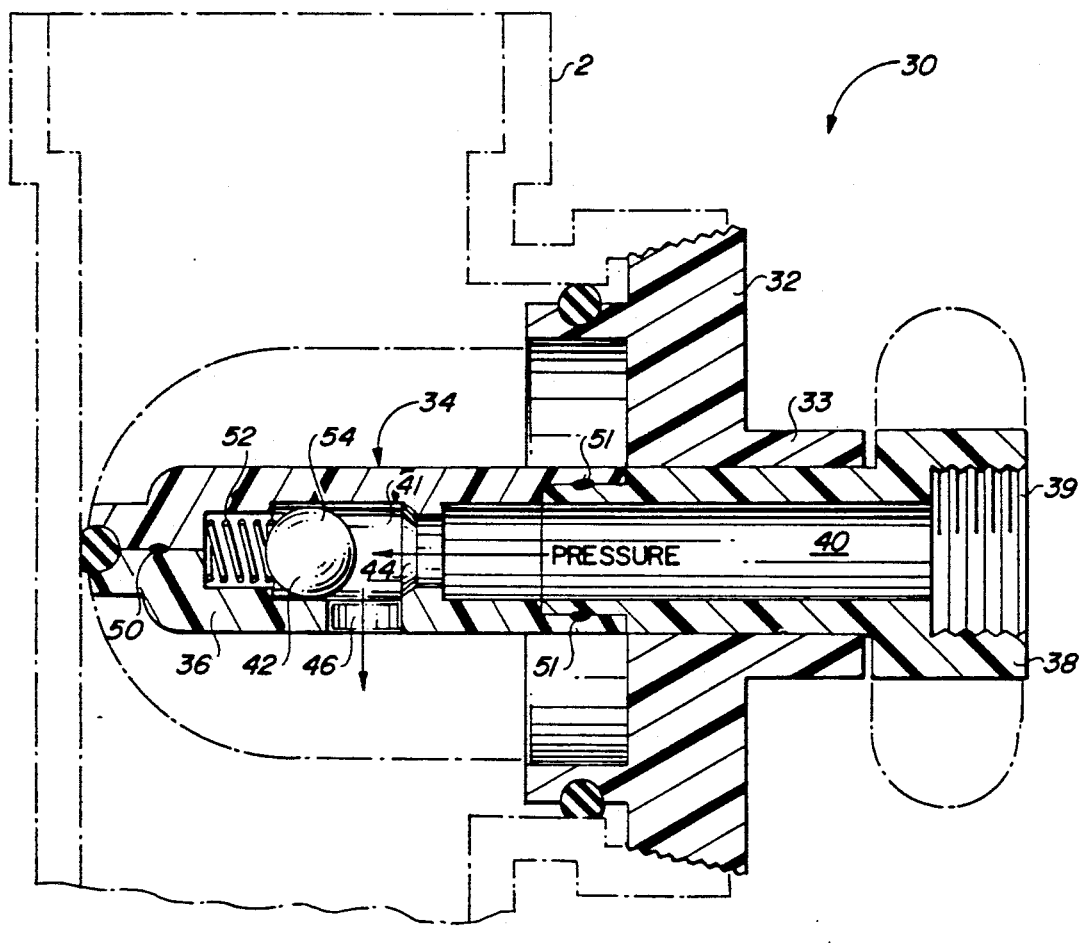
FIG. 5 is a side elevational cross-sectional view of the alternative preferred embodiment of the present invention.
Figure 4:
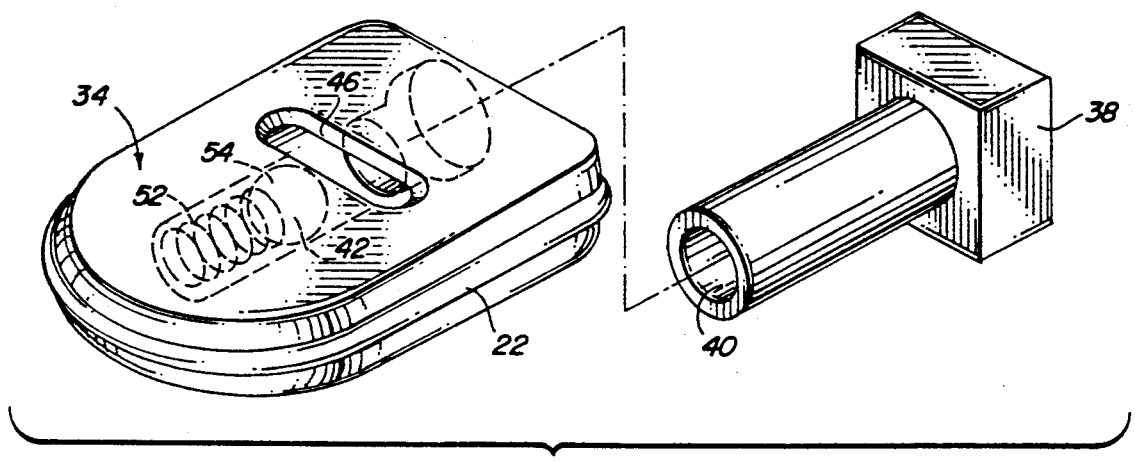
FIG. 4 is a perspective partially exploded view of an alternative preferred embodiment of the present invention.

An alternative preferred embodiment of the invention is illustrated with reference to FIGS. 4 and 5. Leak testing apparatus 30, in accordance with this alternative preferred embodiment, consists generally of a sealing member 34 and a fluid inlet member 38. Fluid inlet member 38 consists generally of a fluid inlet coupling 39, to which a source of fluid may be demountably coupled, and an annular shaft defining a fluid inlet chamber 40 in fluid flow communication with the fluid inlet coupling 39. Sealing member 34 consists generally of an internal fluid receiving chamber 41, which receives fluid from fluid inlet chamber 40, a fluid outlet 46 and a valve member 42 interdisposed between the fluid inlet chamber 40 and the fluid outlet 46.

In accordance with this preferred embodiment of leak testing apparatus 30, there is also provided a cap member 32, however cap member 32 is provided with a central bore which rotatably receives fluid inlet member 38 therein. Sealing member 34 may be made of two mating members 34 and 36 which may be ultrasonically or chemically welded, at weld points 50, to each other and to the fluid inlet member 38 to provide a substantially unitary and integral attachment therebetween. Valve member 42 may consist of any suitably pressure-actuated valve which opens and closes upon application or withdrawal of a pre-selected fluid pressure. For example, as illustrated in the Figures, valve member 42 may consist of a spring loaded check valve having a valve seating member 54 which seals one end of the fluid receiving chamber 41 and a valve spring member 52 which seats against an opposing end of fluid receiving chamber 41.

Those skilled in the art will understand and appreciate that it is also desirable to provide a protrusion 33 associated with cap member 32 to permit attachment of a wrench or other tool to engage the cap member 32 and apparatus 30 within tee-fitting 2 in a sealing arrangement. Additionally, those skilled in the art will understand the desirability of providing o-ring seals 22 about the outer periphery of sealing member 34 and an internal protrusion of cap member 34, to permit the seating and fluid tight seating of apparatus 30 within tee-fitting 2.

In operation, sealing member 34 is inserted into the Y or tee-fitting 2 of the plumbing system. The threads on the cap member 32 are engaged into the internal threads of the fitting 2, causing the 0-rings 22 to seal against the interior wall and about the diameter d of the tee fitting 2. Either the shaft member 24, or the fluid inlet member 38, is wheel 48 is rotated such that the fluid outlet 46 discharges fluid upward into vent stack of the plumbing system. A regulated fluid source, such as a hose with a valve, is attached the fluid inlet 12 or 39. When fluid flow is initiated, the fluid enters the inlet shaft 16, the fluid pressure causes the valve member 15 or 42, to open, whereupon fluid exits the valve member 15 or 42 through the outlet 46 and enters the plumbing system to permit testing the system for leaks. When the test is completed, the shaft member 24 or the fluid inlet member 38 is rotated, thereby rotating the sealing member 34 or 20, and disengaging the 0-ring seal 22 from the interior wall of the tee-fitting and allowing the fluid to drain into the drain pipe. The cap member 14 or 32 is then disengaged and the apparatus 10 or 30 removed from the test section.

While the invention has been shown in several of its alternative forms, it is not thus limited, but is susceptible to various modifications in design and materials without departing from the scope of the invention.

I claim:

1. Apparatus for pressure testing plumbing systems having a Y or tee fitting, comprising:
    a cap member adapted to demountably couple to the Y or tee fitting;
    a substantially planar sealing member rotatably coupled and positioned generally perpendicular to said cap member, said substantially planar sealing member being rotatably about a central axis of said cap member and adapted to engage, in sealed relationship, to an inner diameter of the Y or tee fitting; and
    means for introducing a flow of fluid through said cap member and into the plumbing system.

2. The apparatus according to claim 1, wherein said cap member further comprises fluid inlet means for operably coupling to an external source of fluid.

3. The apparatus according to claim 1, wherein said means for introducing a flow of fluid is operably coupled to said cap member.

4. The apparatus according to claim 1, wherein said means for introducing a flow of fluid is coupled to said sealing member and in fluid flow communication therewith.

5. The apparatus according to claim 1, wherein said means for introducing a flow of fluid further comprises valve means for regulating a flow of fluid into and through said means for introducing a flow of fluid.

6. The apparatus according to claim 5, wherein said valve means further comprises a spring loaded check valve.

7. The apparatus according to claim 6, wherein said spring loaded check valve further comprises a helical expansion spring, a tubular valve-spring chamber, a ball member, a valve seat, and a fluid outlet port.

8. The apparatus according to claim 1, wherein said sealing member further comprises a paddle-shaped member having means for seating and sealing said paddle-shaped member against an inner diameter of the Y or tee-fitting.

9. The apparatus according to claim 8, wherein said sealing means further comprises at least one of a plurality of resilient sealing rings forming a fluid tight seal between said paddle-shaped member and an inner diameter of the Y or T fitting.

10. The apparatus according to claim 1, wherein said means for introducing a flow of fluid further comprises a fluid inlet member comprising a coupling member for coupling to a source of fluid and defining a fluid inlet chamber, said fluid inlet member being rotatably mounted within said cap member.

11. The apparatus according to claim 10, wherein said sealing member further comprises an internal fluid receiving chamber in fluid flow communication with said fluid inlet chamber of said fluid inlet member, a fluid outlet opening on a planar surface of said sealing member, and valve means interdisposed between said fluid receiving chamber and said fluid outlet opening for regulating a flow of fluid therebetween.

12. The apparatus according to claim 11, wherein said sealing member further comprises an upper planar portion non-demountably coupled to a lower planar portion, wherein said fluid receiving chamber is defined therebetween, each of said upper planar portion and said lower planar portion being non-demountably coupled to said fluid inlet member.

13. Apparatus for pressure testing plumbing systems having a Y or tee fitting, comprising:
a cap member adapted to demountably couple to the Y or tee fitting;
a substantially planar sealing member rotatably coupled to said cap member, said member being adapted to engage, in sealed relationship to an inner diameter of the Y or tee fitting;
a shaft member coaxially disposed through said cap member and into said sealing member, wherein said shaft member is rotatable within said cap member and coupled to said sealing member; and
means for introducing a flow of fluid through said cap member and into the plumbing system.

14. A plumbing leak tester for the pressure testing of liquid drain and vent systems having a Y or T test section, comprising:
a freely rotatable fluid inlet means comprising an internally threaded end portion;
a spring loaded check valve comprising a helical expansion spring, a tubular valve-spring chamber, a ball member, a valve seat, and a fluid outlet port;
a fluid inlet shaft interconnecting said freely rotatable fluid inlet means and said spring loaded check valve;
a freely rotatable externally threaded cap member located concentrically about said fluid inlet shaft, wherein said freely rotatable externally threaded cap member is suitable for being connected to said Y or T test section;
a paddle-like component comprising a planar paddle-shaped member, a planar, substantially circular end piece, and a first and second sealing means comprising at least one of a plurality of resilient sealing rings for sealing said planar paddle-shaped member and said planar, substantially circular end piece respectively; wherein said planar, substantially circular end piece abuts said freely rotatable externally threaded cap member; wherein said first and second sealing means are located in a grooved outer edge of said planar paddle-shaped member and said planar, substantially circular end piece respectively;
a stiffening member rigidly attached to said freely rotatable externally threaded cap member; and
a hand wheel mounted to an exterior wall of said fluid inlet shaft for rotating said paddle-like component.

* * * * *

UNITED STATES PATENT AND TRADEMARK OFFICE
CERTIFICATE OF CORRECTION

PATENT NO. : 5,076,095

DATED : December 31, 1991

INVENTOR(S) : Rick D. Erhardt

It is certified that error appears in the above-identified patent and that said Letters Patent is hereby corrected as shown below:

Column 4, line 8, claim 1, change "rotatably" to -- rotatable --.

Signed and Sealed this

Twenty-second Day of June, 1993

Attest:

MICHAEL K. KIRK

*Attesting Officer*    Acting Commissioner of Patents and Trademarks